US012706877B2

(12) United States Patent
Zhang

(10) Patent No.: US 12,706,877 B2
(45) Date of Patent: Aug. 11, 2026

(54) SYSTEM AND METHODS FOR LIVE STREAMING USING APPLICATION-SPECIFIC INTERNET PROTOCOL ADDRESS CACHE SETS

(71) Applicant: Beijing Zitiao Network Technology Co., Ltd., Beijing (CN)

(72) Inventor: Donghui Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 26 days.

(21) Appl. No.: 18/886,373

(22) Filed: Sep. 16, 2024

(65) Prior Publication Data

US 2025/0106183 A1 Mar. 27, 2025

(30) Foreign Application Priority Data

Sep. 21, 2023 (CN) ........................ 202311229821.8

(51) Int. Cl.
*H04L 61/58* (2022.01)
*H04L 61/4511* (2022.01)
*H04N 21/2187* (2011.01)

(52) U.S. Cl.
CPC .......... *H04L 61/58* (2022.05); *H04L 61/4511* (2022.05); *H04N 21/2187* (2013.01)

(58) Field of Classification Search
None
See application file for complete search history.

(56) References Cited

U.S. PATENT DOCUMENTS 8,156,199 B1 * 4/2012 Hoche-Mong ...... H04L 63/0272 709/224
8,285,781 B1 * 10/2012 Badros .................... H04L 61/58 709/224
2003/0172183 A1 * 9/2003 Anderson, IV ..... H04L 61/5014 709/230
2009/0019181 A1 * 1/2009 Fang ....................... H04L 61/58 709/245
2018/0246983 A1 * 8/2018 Rathod ................. G06F 16/972
2019/0164615 A1 * 5/2019 Kim ...................... G06F 3/0659
2019/0166085 A1 * 5/2019 Li ......................... H04L 9/3239
2021/0092463 A1 * 3/2021 Gupta ................. A63F 13/5255
2021/0329089 A1 * 10/2021 Yellin ................. H04L 67/5681
2022/0245904 A1 * 8/2022 Saxena ................. G06T 19/006
2025/0106183 A1 * 3/2025 Zhang ................ H04N 21/2187
2026/0050241 A1 * 2/2026 Luo ...................... G05B 13/024

FOREIGN PATENT DOCUMENTS

CN 110636150 A 12/2019
CN 114245182 A 3/2022

* cited by examiner

*Primary Examiner* — Jason D Cardone
(74) *Attorney, Agent, or Firm* — BakerHostetler

(57) ABSTRACT

A live streaming processing method, a terminal device, and a non-transitory computer readable storage medium are provided. The method includes: acquiring a domain name of a live streaming to be played by a live streaming application; acquiring an internet protocol address cache set corresponding to the live streaming application, the internet protocol address cache set including all domain names associated with the live streaming application and an internet protocol address corresponding to each domain name; and generating a first frame of the live streaming based on the domain name of the live streaming and the internet protocol address cache set.

14 Claims, 9 Drawing Sheets

SYSTEM AND METHODS FOR LIVE STREAMING USING APPLICATION-SPECIFIC INTERNET PROTOCOL ADDRESS CACHE SETS

CROSS REFERENCE TO RELATED APPLICATIONS

The present application claims the priority and benefits to the Chinese Patent Application No. 202311229821.8, entitled "Live Streaming Processing Method, Apparatus, and Terminal Device" filed on Sep. 21, 2023, the entire content of which is incorporated into the present application by reference.

TECHNICAL FIELD

The embodiments of the present disclosure relate to the technical field of live streaming, and in particular to a live streaming processing method, a terminal device, and a non-transitory computer readable storage medium.

BACKGROUND

First-frame spent time of live streaming refers to a duration between a time of a user clicking a view button for a live streaming and a time of the user seeing the first frame of this live streaming. By shortening the first-frame spent time of the live streaming, the user's experience in watching the live streaming can be improved.

At present, with respect to a domain name that has been historically viewed and resolved, a terminal device can store an Internet Protocol (IP) address corresponding to this domain name. In this way, when a user watches the live streaming corresponding to this domain name again, the IP address corresponding to this domain name can be directly used to decode the first frame of the live streaming. According to the above method, however, if a domain name of a live streaming is not resolved during historical time periods, the terminal device does not store the IP address corresponding to this domain name and needs to resolve this domain name, which needs a longer first-frame spent time of the live streaming.

SUMMARY

Embodiments of the present disclosure provide a live streaming processing method, a terminal device, and a non-transitory computer readable storage medium to solve one or more technical problems in the art.

In a first aspect, embodiments of the present disclosure provide a live streaming processing method, comprising: acquiring a domain name of a live streaming to be played by a live streaming application; acquiring an internet protocol address cache set corresponding to the live streaming application, the internet protocol address cache set comprising all domain names associated with the live streaming application and an internet protocol address corresponding to each domain name; and generating a first frame of the live streaming based on the domain name of the live streaming and the internet protocol address cache set.

In a second aspect, embodiments of the present application provide a terminal device, comprising: a processor and a memory. Computer executable instructions are stored in the memory; and the processor executes a live streaming processing method upon the processor executing the computer executable instructions stored in the memory; and the live streaming processing method comprises: acquiring a domain name of a live streaming to be played by a live streaming application; acquiring an internet protocol address cache set corresponding to the live streaming application, the internet protocol address cache set comprising all domain names associated with the live streaming application and an internet protocol address corresponding to each domain name; and generating a first frame of the live streaming based on the domain name of the live streaming and the internet protocol address cache set.

In a third aspect, embodiments of the present disclosure provide a non-transitory computer-readable storage medium. Computer executable instructions are stored in the non-transitory computer readable storage medium, and a live streaming processing method is implemented upon the computer executable instructions being executed by at least a processor; and the live streaming processing method comprises: acquiring a domain name of a live streaming to be played by a live streaming application; acquiring an internet protocol address cache set corresponding to the live streaming application, the internet protocol address cache set comprising all domain names associated with the live streaming application and an internet protocol address corresponding to each domain name; and generating a first frame of the live streaming based on the domain name of the live streaming and the internet protocol address cache set.

BRIEF DESCRIPTION OF THE DRAWINGS

To illustrate the technical solutions in embodiments of the present application or the related art more clearly, the accompanying drawings which are required to describe the embodiments or the related art will be briefly described below. Apparently, for one of ordinary skill in the art, other drawings can be obtained on the basis of these drawings without any creative work.

DETAILED DESCRIPTION

Figure 1:
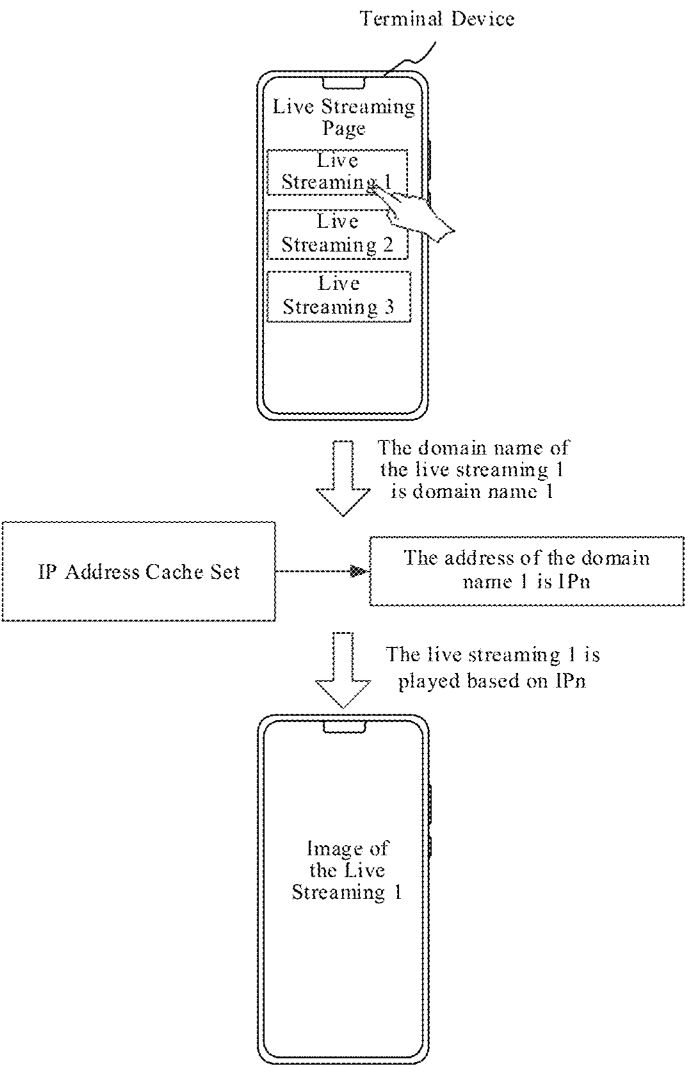
FIG. 1 is a schematic diagram of an application scenario according to an embodiment of the present disclosure.

Herein, Exemplary embodiments will be described in details, which are illustrated in the accompanying drawings. When the following description involves drawings, unless otherwise indicated, same numerals in different figures represent the same or similar elements.

To understand the above objects, features, and advantages more clearly, the solutions of the present application will be further described below. It is to be noted that, without conflicting with each other, the embodiments and features in embodiments of the present application can be combined with each other.

Many particular details are set forth in the following description to sufficiently understand the present application, but the present application can be implemented by other ways than those described herein. Apparently, the embodiments in the description are merely some, not all embodiments of the present application.

In the embodiments of the present application, the terms like "exemplary" or "for example/such as", etc. are used to represent an example, exemplary illustration, or explanation. Any embodiment or design described as being "exemplary" or "for example/such as" should not be construed to be more preferable or advantageous over other embodiments or designs. Specifically, the use of the terms "exemplary" or "fox example/such as" is intended to present an associated concept in a specific manner. In addition, in the description of the embodiments of the present application, "a plurality of/multiple" refers to two or more, unless otherwise specified.

For a better understanding, the concepts involved in the embodiments of the present disclosure will be described hereinbelow.

A terminal device is a device having wireless transmission and reception functions. The terminal device may be deployed on land, including indoor or outdoor, handheld, wearable, or vehicle-mounted. The terminal device may be a mobile phone, a tablet computer (Pad), a computer with wireless transmission and reception functions, a virtual reality (VR) terminal device, an augmented reality (AR) terminal device, a wireless terminal in industrial control, a vehicle-mounted terminal device, a wireless terminal in self-driving, a wireless terminal device in remote medical, a wireless terminal device in smart grid, a wireless terminal device in transportation safety, a wireless terminal device in smart city, a wireless terminal device in smart home, a wearable terminal device, etc. The terminal device involved in the embodiments of the present disclosure may also be called terminal, user equipment (UE), access terminal device, in-vehicle terminal, industrial control terminal, UE unit, UE station, moving station, mobile station, remote station, remote terminal device, mobile device, UE terminal device, wireless communication device, UE agent or UE apparatus, etc. The terminal device may also be stationary or movable.

In live streaming technology, first-frame spent time of live streaming refers to a duration between a time of a user clicking a watch button for a live streaming and a time of the user seeing the first frame of this live streaming, so the user's experience in watching live streaming can be improved by shortening the first-frame spent time of live streaming. During a process that the first frame of the live streaming is generated by the terminal device, it takes a long time to resolve the domain name of the live streaming, so optimizing the domain name resolution for live streaming can effectively shorten the first-frame spent time of live streaming. At present, the terminal device can store a domain name that has been historically viewed and resolved, so as to obtain a cache of an IP corresponding to the domain name. Because this cache includes the domain name that has already been resolved by the terminal device, when the live streaming of the same domain name is played by the terminal device next time, the terminal device is able to directly acquire the IP address based on this cache, without resolving the domain name. For example, the terminal device can play the live streaming 1 after the terminal device starts a live streaming application, the domain name of live streaming 1 is the domain name 1 which is then resolved by the terminal device to obtain IP address 1, and when the live streaming 2 is played by the terminal device, the terminal device can directly use IP address 1 to play the live streaming 2 if the domain name of live streaming 2 is also the domain name 1. In the above method, however, for those domain names that are viewed for the first time, the terminal device is also required to resolve them. Also, there are a large quantity of domain names corresponding to the live streaming application and a relatively low hit rate of the domain names in historical IP caches, thus leading to a longer first-frame spent time of live streaming.

To address the technical problems in live streaming technology, embodiments of the present disclosure provide a live streaming processing method. A terminal device can acquire a domain name list of a live streaming application, and this domain name list includes all domain names associated with the live streaming application. The terminal device can perform DNS (domain name server) resolution on a plurality of domain names in the domain name list, determine an IP address corresponding to each domain name, and determine a corresponding relationship between each domain name and the IP address as an IP address cache set. The terminal device can acquire the domain name of a live streaming to be played by the live streaming application, and acquire the IP address cache set corresponding to the live streaming application, and this IP address cache set may include all the domain names associated with this live streaming application and IP addresses corresponding to at least one domain name. The terminal device can determine the IP address corresponding to the domain name of the live streaming in the IP address cache set, and generate the first frame of the live streaming based on this IP address. In this way, before the terminal device plays the live streaming, the terminal device can acquire in advance all the domain names associated with the live streaming application and the IP addresses corresponding to the domain names. Therefore, when the terminal device plays the live streaming, the terminal device can acquire the IP address corresponding to this live streaming from the IP address cache set based on the domain name of this live streaming, without resolving the domain name of this live streaming. Furthermore, because the IP address cache set may include all the domain names of the live streaming application and the IP addresses corresponding to the domain names, a hit rate of the domain names hitting this IP address cache set is higher, which accordingly can shorten the first-frame spent time of a plurality of live streaming videos and improve user's experience.

With reference to FIG. 1, an application scenario for the embodiment of the present disclosure will be described below.

FIG. 1 is a schematic diagram of an application scenario according to an embodiment of the present disclosure. Referring to FIG. 1, a terminal device is included. A display page of the terminal device is a live streaming page, which may include live streaming 1, live streaming 2, and live streaming 3. When a user clicks the live streaming 1, the terminal device can determine that the domain name of the live streaming 1 is domain name 1 and that domain name 1 is included in, and an IP address (IPn) corresponding to domain name 1 is also included in the IP address cache set. The terminal device can determine that the IP address of live streaming 1 is IPn in the IP address cache set, and play the live streaming 1 based on IPn. The page displayed by the terminal device may include an image of the live streaming 1. In this way, when the terminal device plays the live streaming 1, the terminal device can determine the IP address corresponding to the domain name of the live streaming 1 in the IP address cache set. In this way, there is no need to resolve the domain name of the live streaming 1, which can shorten the first-frame spent time of the live streaming 1 and improve user experience.

It is to be noted that FIG. 1 is merely an exemplary illustration of the application scenario of the embodiment of the present disclosure, the application scenario of the embodiment of the present disclosure is not a limited thereto.

The technical solution of the present disclosure and how to address the above technical problems by the technical solution of the present disclosure will be described below in detail in exemplary embodiments. These several exemplary embodiments below may be combined with each other, and identical or similar concepts or processes may not be described in some embodiments. The embodiments of the present disclosure will be described hereinafter in conjunction with the accompanying drawings.

Figure 2:
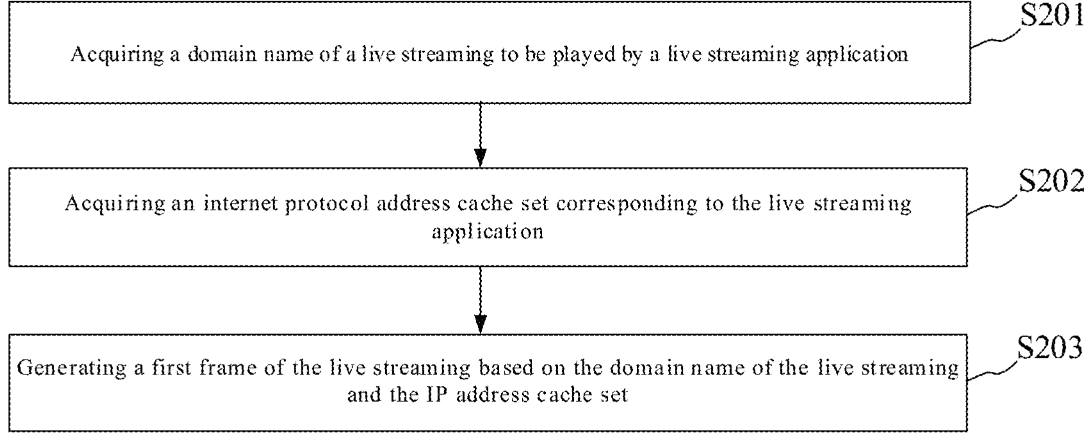
FIG. 2 is a schematic flow diagram of a live streaming processing method according to an embodiment of the present disclosure.

FIG. 2 is a schematic flow diagram of a live streaming processing method according to an embodiment of the present disclosure. With reference to FIG. 2, this method may include following steps.

S201: Acquiring a domain name of a live streaming to be played by a live streaming application.

The execution entity for the embodiment of the present disclosure may be a terminal device, or a live streaming processing apparatus arranged in the terminal device. The live streaming processing apparatus may be implemented based on software or on a combination of software and hardware, and the embodiment of the present disclosure is not limited thereto.

The live streaming application may include a client that plays a live streaming video. For example, after the live streaming application is started by the terminal device, the live streaming video may be played in a display page of the terminal device.

The live streaming domain name may refer to a corresponding domain name in the address (URL) of a live streaming video resource, which the user watches, and this domain name may represent a domain name corresponding to a server-side CDN (content delivery network) edge node. For example, the domain name of the live streaming may correspond to an Internet Protocol (IP) address, in which the IP address may be the IP address of the content distribution network (CDN) edge node. For example, the terminal device may resolve the domain name of the live streaming, and therefore the IP address corresponding to this live streaming may be determined, and this live streaming is played based on this IP address.

It is to be noted that the domain names of the live streaming in the embodiment of the present disclosure are a plurality of domain names configured for all live streaming by the live streaming application, and are independent of the domain name of the user. Moreover, the IP address in the embodiment of the present disclosure is the address of the server-side CDN edge node and is independent of the domain name of the user.

Optionally, the terminal device may determine the live streaming to be played based on the following feasible implementation: displaying a page of the live streaming application, and in response to a touch operation on a live streaming in the page of the live streaming application, determining the live streaming corresponding to the touch operation as the live streaming to be played.

At least one live streaming may be included in the page of the live streaming application. For example, after the live streaming application is started by the terminal device, the terminal device may display the page of the live streaming application in which a plurality of live streaming videos may be included, and upon any live streaming being clicked by the user, the terminal device may play this live streaming. For example, the page of the live streaming application may include live streaming 1 and live streaming 2, the terminal device may determine the live streaming 1 as the live streaming to be played if the user clicks the live streaming 1 and may determine the live streaming 2 as the live streaming to be played if the user clicks the live streaming 2.

The process of determining a live streaming to be played will be described below with reference to FIG. 3.

Figure 3:
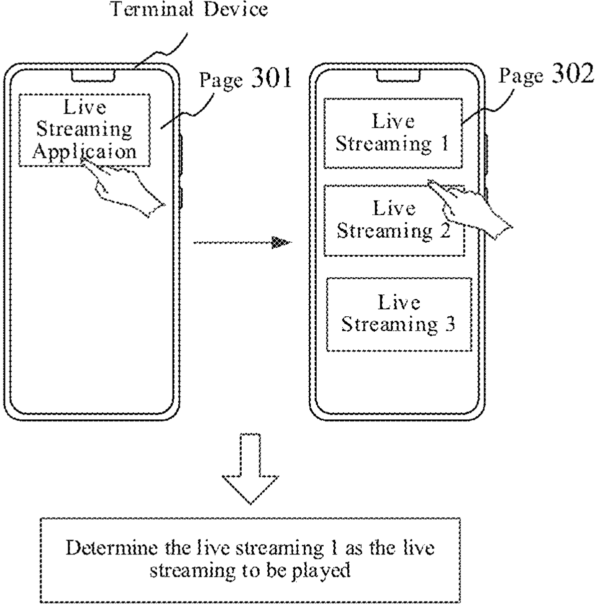
FIG. 3 is a schematic diagram showing a process of determining a live streaming to be played according to an embodiment of the present disclosure.

FIG. 3 is a schematic diagram showing a process of determining a live streaming according to the embodiment of the present disclosure. With reference to FIG. 3, a terminal device is included. A display page of the terminal device includes page 301 and page 302. The page 301 may be an application page of the terminal device. The page 301 may include a live streaming application, and when the user clicks the live streaming application, the display page of the terminal device jumps to the page 302 from the page 301. The page 302 may be a page of the live streaming application, in which the live streaming 1, the live streaming 2 and the live streaming 3 may be included. The terminal device may determine the live streaming 1 as the live streaming to be played when the user clicks the live streaming 1 in the page 302.

Optionally, the terminal device may determine the live streaming to be played based on the following feasible implementation: in response to a touch operation on the live streaming application, determining the first live streaming subsequent to the starting of the live streaming application as the live streaming to be played. For example, when the terminal device displays the page of the live streaming application during actual application, this page may include the first live streaming subsequent to the starting of the live streaming application (it can be determined based on the user's habit of watching live streaming, and there is no limitation thereto in the embodiment of the present disclosure), and the terminal device may determine this live streaming as the live streaming to be played. For example, after the live streaming application is started by the terminal device, the terminal device may determine the live streaming 1 as the live streaming to be played if the live streaming 1 is to be displayed in the page of the live streaming application, and may determine the live streaming 2 as the live streaming to be played if the live streaming 2 is to be displayed in the page of the live streaming application.

The process of determining a live streaming to be played will be described below with reference to FIG. 4.

Figure 4:
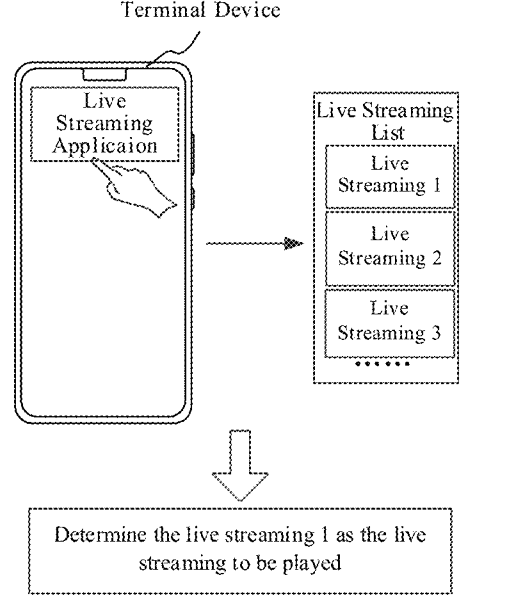
FIG. 4 is a schematic diagram showing another process of determining a live streaming to be played according to an embodiment of the present disclosure.

FIG. 4 is a schematic diagram showing another process of determining a live streaming to be played according to an embodiment of the present disclosure. With reference to FIG. 4, a terminal device is included. A display page of the terminal device may be an application page in which a live streaming application may be included. When the user clicks the live streaming application, the terminal device may acquire a live streaming list of this live streaming application. A plurality of live streaming videos that are orderly arranged, such as the live streaming 1, the live streaming 2, the live streaming 3, etc., may be included in the live streaming list, and the order of playing the live streaming may be the same as the order of the arrangement sequence in the live streaming list. The live streaming 1 is the first live streaming that is to be played by the live streaming application, so the terminal device may determine the live streaming 1 as the live streaming to be played.

Optionally, the terminal device may determine the live streaming to be played based on the following feasible implementation: in response to a swiping operation on a currently-played live streaming, determining a next live streaming next to the currently-played live streaming as the live streaming to be played. For example, the live streaming 1 is being played in the display image of the live streaming application, the next live streaming of the live streaming 1 is the live streaming 2, and if the user swipes up the live streaming 1, the terminal device may determine the live streaming 2 as the live streaming to be played.

The process of determining a live streaming to be played will be described below with reference to FIG. 5.

Figure 5:
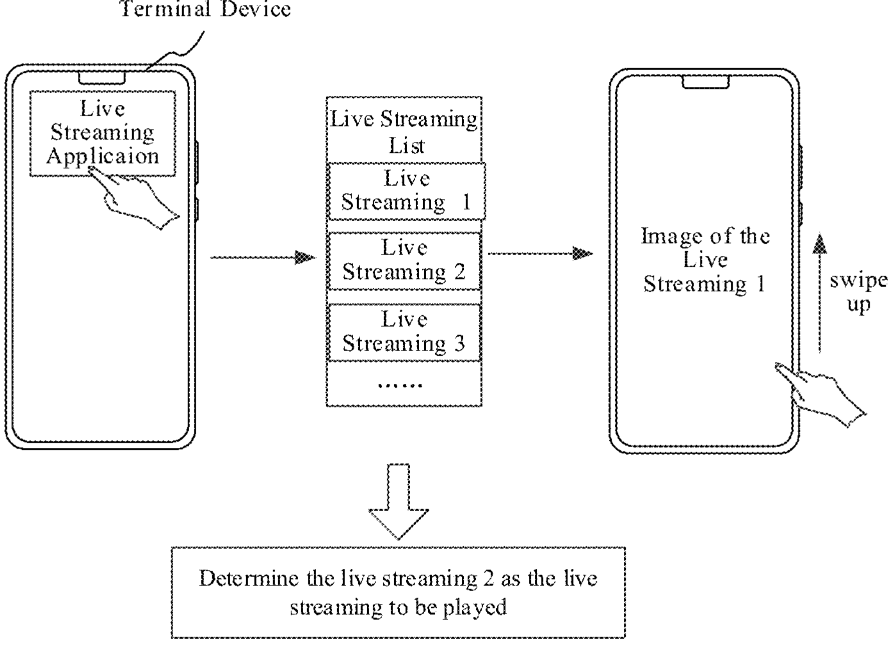
FIG. 5 is a schematic diagram showing another process of determining a live streaming to be played according to the embodiment of the present disclosure.

FIG. 5 is a schematic diagram showing another process of determining a live streaming to be played according to an embodiment of the present disclosure. With reference to FIG. 5, a terminal device is included. A display page of the terminal device may be an application page in which a live streaming application may be included. When the user clicks the live streaming application, the terminal device may acquire a live streaming list of this live streaming application. A plurality of live streaming videos that are orderly arranged, such as the live streaming 1, the live streaming 2, the live streaming 3, etc., may be included in the live streaming list, and the order of playing the live streaming is the same as the order of arrangement sequence in the live streaming list. The live streaming 1 is the first live streaming in the live streaming list, so the terminal device may display the image of the live streaming 1. When the user swipes up the image of the live streaming 1, the terminal device may determine the live streaming 2 as the live streaming to be played.

It is to be noted that the terminal device may determine the domain name of the live streaming to be played based on any feasible implementation, and this is not limited in the embodiment of the present disclosure.

It is to be noted that the terminal device may determine the domain name of the live streaming to be played based on any feasible implementation after determining the live streaming to be played, and this is not limited in the embodiment of the present disclosure.

S202: Acquiring an internet protocol address cache set corresponding to the live streaming application.

The internet protocol address cache set may include all domain names associated with the live streaming application and an internet protocol address corresponding to each domain name. For example, the live streaming application may be associated with a plurality of domain names, and the live streaming in the live streaming application may be played based on the plurality of domain names. For example, if the live streaming application may be associated with the domain name 1, the domain name 2, and the domain name 3, then all live streaming videos in the live streaming application may be played based on the domain name 1, the domain name 2, and the domain name 3.

It is to be noted that a plurality of domain names associated with each live streaming application may be preconfigured domain names, the terminal device may determine a plurality of domain names associated with the live streaming application based on an identification of the live streaming application, and this is not limited in the embodiment of the present disclosure.

Optionally, the IP address cache set corresponding to the live streaming application may include all domain names associated with the live streaming application and an IP address corresponding to each domain name. For example, the domain names associated with the live streaming application include the domain name 1, the domain name 2, and the domain name 3, and thus, the IP address cache set corresponding to this live streaming application may include a corresponding relationship between the domain name 1 and an IP address, a corresponding relationship between the domain name 2 and an IP address, and a corresponding relationship between the domain name 3 and an IP address. For example, the IP address cache set corresponding to the live streaming application may be shown as Table 1:

TABLE 1

| Domain Name | IP Address |
|---|---|
| Domain Name 1 | Address 1, Address 2 |
| Domain Name 2 | Address 3, Address 4 |
| Domain Name 3 | Address 5 |
| . . . | . . . |

It is to be noted that Table 1 is merely an exemplary illustration of the IP address cache set, rather than a limitation to the IP address cache set.

In some embodiments, for example, one domain name may correspond to either one IP address or a plurality of addresses, the embodiment of the present disclosure is not limited thereto. For example, the IP address cache set may include the corresponding relationships between the domain name 1 and the IP address 1, the IP address 2, and the IP address 3, and may also include the corresponding relationship between the domain name 2 and the IP address 4.

It is to be noted that the IP address cache set corresponding to the live streaming application may be a pre-acquired set. For example, at a cold start stage of a live streaming application, the terminal device may acquire the IP address cache set corresponding to this live streaming application, which can raise the hit rate of domain names in the IP address cache set and shorten the first-frame spent time, and the memory space can also be saved.

S203: Generating a first frame of the live streaming based on the domain name of the live streaming and the IP address cache set.

The terminal device may generate the first frame of the live streaming based on the following feasible implementation: determining a target domain name identical to the domain name of the live streaming in the internet protocol address cache set; determining an internet protocol address corresponding to the target domain name as an internet protocol address corresponding to the domain name of the live streaming; and decoding the first frame of the live streaming based on the internet protocol address corresponding to the domain name of the live streaming, and obtaining the first frame of the live streaming.

For example, the internet protocol address cache set includes the domain name 1, the domain name 2, and the domain name 3, the domain name 1 corresponds to the IP address A, the domain name 2 corresponds to the IP address B, and the domain name 3 corresponds to the IP address C. If the domain name of the live streaming is the domain name 1, then the terminal device may determine that the IP address corresponding to the domain name of the live streaming is IP address A.

Because the terminal device has requested a server to send all the domain names corresponding to the live streaming application at the start stage of the live streaming application, the terminal device can resolve each domain name to obtain the IP address corresponding to each domain name. When the user watches the live streaming of the live streaming application, the domain name used by this live streaming may be a domain name in the IP address cache set, so the terminal device has pre-resolved this domain name and can directly acquire the IP address corresponding to this domain name from the IP address cache set.

As shown in Table 1, for example, if the domain name of the live streaming to be played is the domain name 1, the terminal device may determine that the IP addresses corresponding to the domain name of the live streaming are the address 1 and the address 2; if the domain name of the live streaming to be played is the domain name 2, the terminal device may determine that the IP addresses corresponding to the domain name of the live streaming are the address 3 and the address 4; and if the domain name of the live streaming to be played is the domain name 3, the terminal device may determine that the IP address corresponding to the domain name of the live streaming is the address 5.

It is to be noted that the terminal device may generate the IP address cache set corresponding to the live streaming application at the cold start stage of this live streaming application. However, it takes a certain period of time for the terminal device to generate the IP address cache set (the terminal device may resolve each domain name at the cold start stage of the live streaming application, so as to obtain the IP address corresponding to the domain name), so with regard to the first live streaming after the live streaming application is started (e.g., a scenario where a live streaming image is directly displayed after the live streaming application is started), the terminal device may temporarily not resolve the IP address corresponding to this domain name (e.g., the domain name of this live streaming may have a lower ranking in the to-be-resolved domain name list), such that the IP address cache set does not include the IP address of this domain name. Therefore, the terminal device may resolve the domain name of this live streaming, so as to obtain the IP address corresponding to the domain name of the live streaming. The terminal device also resolves the domain name of the first live streaming, but for other live streaming in the live streaming application, the terminal device does not need to resolve their domain names. Thus, the first-frame spent time of a plurality of live streaming can be shortened. For example, the live streaming may be videos or the like, however, the embodiments of the present disclosure are not limited thereof.

It is to be noted that when the IP address cache set does not include the IP address corresponding to the domain name of the live streaming, the terminal device may perform a DNS resolution on the domain name of the live streaming based on any feasible implementation, to obtain the IP address corresponding to the domain name of the live streaming, and this is not limited in the embodiment of the present disclosure.

Optionally, after acquiring the IP address corresponding to the domain name of the live streaming to be played, the terminal device may establish a communication/connection based on Transmission Control Protocol (TPC) to further request http resources for downloading the live streaming data, and the terminal device may de-encapsulate and decode the data and therefore render the first frame of the live streaming.

The process of generating a first frame of a live streaming will be described below with reference to FIG. 6.

Figure 6:
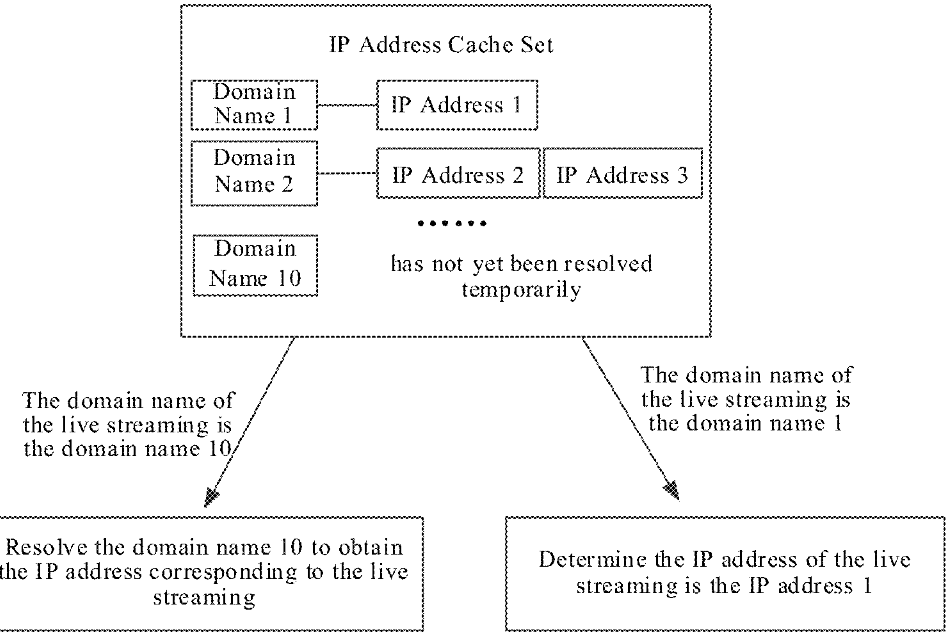
FIG. 6 is a schematic diagram showing a process of generating a first frame of a live streaming according to an embodiment of the present disclosure.

FIG. 6 is a schematic diagram showing a process of generating a first frame of a live streaming according to an embodiment of the present disclosure. With reference to FIG. 6, an IP address cache set is included. The IP address cache set may include the domain name 1, the domain name 2, . . . , the domain name 10. The IP address corresponding to domain name 1 is the IP address 1, the IP addresses corresponding to the domain name 2 are the IP address 2 and the IP address 3, . . . , and the IP address corresponding to the domain name 10 has not yet been resolved temporarily.

With reference to FIG. 6, if the terminal device (not shown in FIG. 6) determines that the domain name of the live streaming to be played is the domain name 10, the terminal device may resolve the domain name 10 to obtain the IP address corresponding to the live streaming because the IP address cache set does not include the IP address corresponding to the domain name 10. If the terminal device determines that the domain name of the live streaming to be played is the domain name 1, the terminal device may determine that the IP address of the live streaming is the IP address 1 based on the IP address cache set. In this way, the reliability and robustness of the determination of IP addresses can be enhanced.

A live streaming processing method as provided in the embodiment of the present disclosure, including: acquiring a domain name of a live streaming to be played by a live streaming application; acquiring an IP address cache set corresponding to the live streaming application; if the IP address cache set includes an IP address corresponding to the domain name of the live streaming, decoding a first frame of the live streaming based on the IP address corresponding to the domain name of the live streaming; and if the IP address cache set does not include the IP address corresponding to the domain name of the live streaming, resolving the domain name of the live streaming to obtain the IP address corresponding to the domain name of the live streaming, and decoding the first frame of the live streaming based on the IP address corresponding to the domain name of the live streaming. In this way, when the IP address cache set does not include the IP address corresponding to the domain name, the terminal device may perform DNS (domain name server) resolution to the domain name to obtain the IP address; and when the IP address cache set includes the IP address corresponding to the domain name, the terminal device may rapidly determine the IP address corresponding to the domain name, which can enhance the reliability and robustness of determining the IP addresses, and can also shorten the first-frame spent time of the live streaming.

On the basis of the embodiment shown in FIG. 2, before the terminal device acquires the domain name of the live streaming to be played by the live streaming application, the above-described live streaming processing method further includes a method of determining the IP address cache set corresponding to the live streaming application. The method of determining an IP address cache set will be described below with reference to FIG. 7.

Figure 7:
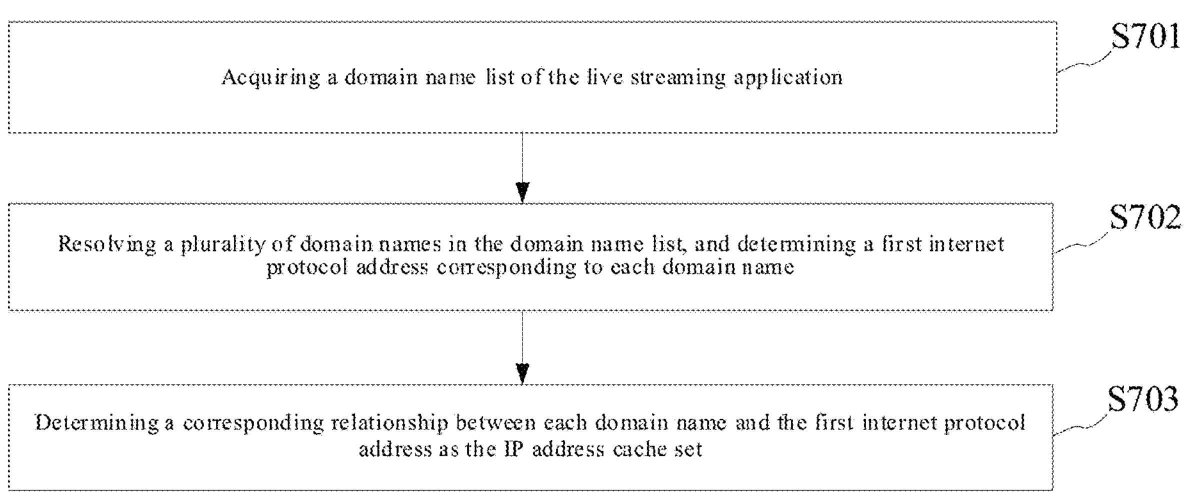
FIG. 7 is a schematic diagram of a method of determining an IP address cache set according to an embodiment of the present disclosure.

FIG. 7 is a schematic diagram of a method of determining an IP address cache set according to an embodiment of the present disclosure. With reference to FIG. 7, the method includes the following steps.

S701: Acquiring a domain name list of the live streaming application.

The domain name list may include all domain names associated with the live streaming application. For example, if all the domain names associated with the live streaming application include the domain name 1, the domain name 2, and the domain name 3, this domain name list may include the domain name 1, the domain name 2, and the domain name 3.

Optionally, the terminal device may acquire the domain name list of the live streaming application based on the following feasible implementation: sending a message to a server in response to a touch operation on the live streaming application, and receiving the domain name list of the live streaming application sent by the server.

The message sent to the server by the terminal device may include an identification of the live streaming application. For example, when the user clicks the live streaming application, the terminal device may request the server to send an entire live streaming domain name list. For example, the server may include a plurality of live streaming applications and all the domain names associated with each live streaming application. Upon reception of the identification of the live streaming application sent by the terminal device, the server may determine all the domain names associated with the identification based on the identification, and send all the domain names associated with the identification to the terminal device.

The process of acquiring a domain name list by the terminal device will be described below with reference to FIG. 8.

Figure 8:
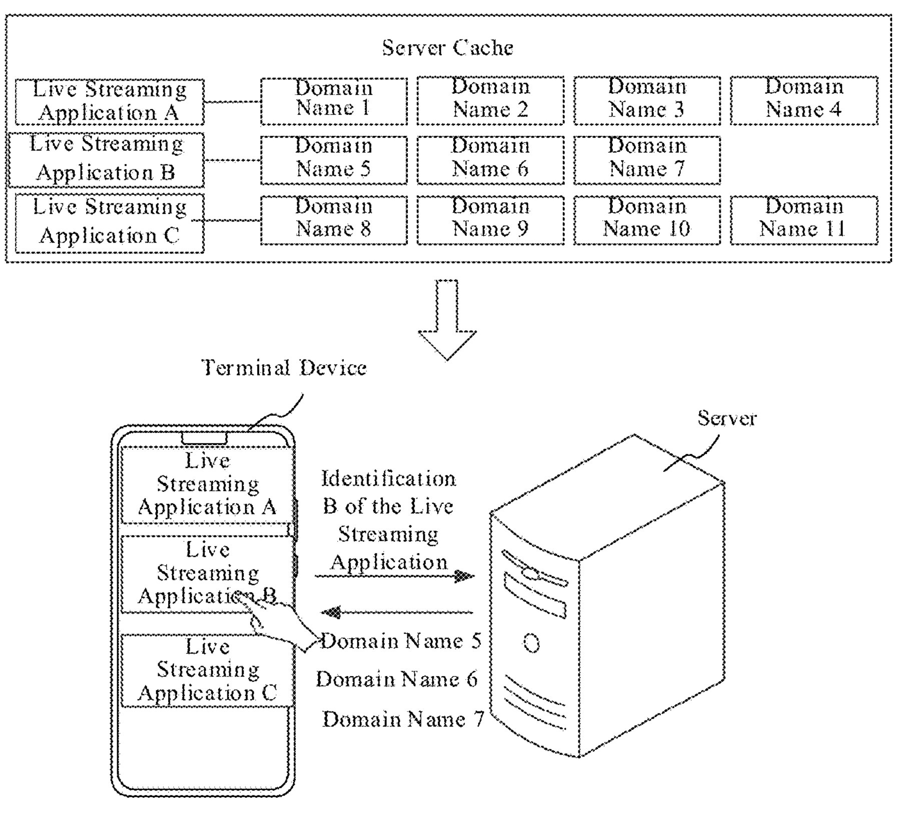
FIG. 8 is a schematic diagram of acquiring a domain name list according to an embodiment of the present disclosure.

FIG. 8 is a schematic diagram of acquisition of a domain name list according to an embodiment of the present disclosure. With reference to FIG. 8, a server cache, a terminal device, and a server are included. The server cache may include all the domain names corresponding to the live streaming application A, all the domain names corresponding to the live streaming application B and all the domain names corresponding to the live streaming application C. The domain names corresponding to the live streaming application A may include the domain name 1, the domain name 2, the domain name 3, and the domain name 4, the domain names corresponding to the live streaming application B may include the domain name 5, the domain name 6, and the domain name 7, and the domain names corresponding to the live streaming application C may include the domain name 8, the domain name 9, the domain name 10, and the domain name 11.

With reference to FIG. 8, the display page of the terminal device includes an application program page, which may include the live streaming application A, the live streaming application B, and the live streaming application C. When the user clicks the live streaming application B, the terminal device may send a starting message for the live streaming application B to the server, and this starting message may include an identification of the live streaming application B. Based on the identification of the live streaming application B, the server determines in the server cache that the domain names corresponding to live streaming application B are the domain name 5, the domain name 6, and the domain name 7. The server may send the domain name 5, the domain name 6, and the domain name 7 to the terminal device. In this way, at the cold start stage of a live streaming application, the terminal device may request the server to send all the domain names associated with this live streaming application, which can raise the hit rate of the domain names of the live streaming in the IP address cache set and further shorten the first-frame spent time of the live streaming.

S702: Resolving a plurality of domain names in the domain name list, and determining a first internet protocol address corresponding to each domain name.

Optionally, the first internet protocol address corresponding to the domain name may be an internet protocol address obtained from DNS resolution of the domain name by the terminal device. For example, if the terminal device perform a DNS resolution on the domain name A and the IP addresses obtained are the IP address 1, the IP address 2, and the IP address 3, the terminal device may determine that the first IP address corresponding to the domain name A includes the address 1, the address 2, and the address 3; and if the terminal device performs a DNS resolution on the domain name B and the IP addresses obtained are the IP address 4 and the IP address 5, the terminal device may determine that the first IP address corresponding to the domain name B includes the address 4 and the address 5.

It is to be noted that the terminal device may resolve a plurality of domain names in the domain name list to obtain the first IP address corresponding to each domain name based on any feasible implementation, and this is not limited in the embodiment of the present disclosure.

S703: Determining a corresponding relationship between each domain name and the first internet protocol address as the IP address cache set.

Optionally, after the terminal device determines the first internet protocol address corresponding to each domain name associated with the live streaming application, the internet protocol address cache set corresponding to the live streaming application can be obtained. For example, the domain name list of the live streaming application acquired by the terminal device includes the domain name A and the domain name B, the terminal device performs a DNS resolution on domain the name A to obtain the IP address 1 and the IP address 2, and the terminal device performs a DNS resolution on the domain name B to obtain the IP address 3, the IP address 4, and the IP address 5. The terminal device may determine that the IP address cache set corresponding to the live streaming application includes two corresponding relationships, one of which is the corresponding relationship between the domain name A and the IP addresses 1 and 2, while the other corresponding relationship is the corresponding relationship between the domain name B and the IP addresses 3, 4, and 5.

In this way, at the cold start stage of the live streaming application, the terminal device can acquire all the domain names associated with this live streaming application, and can also resolve each domain name to obtain the first IP address corresponding to each domain name. Because the live streaming application has not yet played a live streaming video at this stage, the terminal device has acquired the IP addresses corresponding to all the domain names before the live streaming application plays the live streaming video. Therefore, the first-frame spent time of the live streaming can be shortened by omitting the domain name resolution step during the process of rendering the first frame of the live streaming by the terminal device.

Optionally, after the terminal device determines the IP address cache set, due to expiration or change of the IP addresses in the IP address cache set, the terminal device may also update the IP addresses in the IP address cache set, in which there are two following situations for the process of updating the IP addresses in the IP address cache set by the terminal device.

Situation 1: A Change Happens in Network Connection Type.

The terminal device may judge whether the network connection type of the terminal device in which the live streaming application is present is changed or not, and update the internet protocol addresses in the internet protocol address cache set if the network connection type of the terminal device is changed.

The network connection type may include cellular network and wifi (Wireless Fidelity) network. For example, when a change happens in the type of the network with which the terminal device is connected, the IP address corresponding to the same domain name is different, so after the change happens in the type of the network, the terminal device may update the IP address cache set. For example, when the network with which the terminal device is connected is a cellular network, the IP address cache set may include a corresponding relationship of the domain name A-IP address 1 and a corresponding relationship of the domain name B-IP address 2, and if the network with which the terminal device is connected is switched to a wifi network, the domain name A and the domain name B in the IP address cache set remain unchanged, however, the IP address 1 corresponding to the domain name A and the IP address 2 corresponding to the domain name B needs to be updated.

Optionally, the terminal device may update the IP addresses in the IP address cache set based on the following feasible implementation: re-resolving any domain name in the internet protocol address cache set to obtain a second IP address corresponding to the domain name, and replacing the first internet protocol address corresponding to the domain name with the second internet protocol address corresponding to the domain name.

For example, when the terminal device is connected with a cellular network, the first IP address corresponding to the domain name A in the IP address cache set may include the IP address 1 and the IP address 2, and when the network with which the terminal device is connected is switched to a wifi network from a cellular network, the terminal device re-performs a DNS resolution on the domain name A in the IP address cache set to obtain the IP address 3 and the IP address 4 (the second address), and in the IP address cache set, the terminal device may change the IP address corresponding to the domain name A from the IP address 1 and the IP address 2 to the IP address 3 and the IP address 4. In this way, even if a change happens in the type of the network with which the terminal device is connected, the terminal device may still accurately determine the IP addresses corresponding to the domain names. In this way, the first-frame spent time of the live streaming can be shortened.

It is to be noted that the terminal device may determine whether there is a change in the network state of the terminal device based on polling, and may also determine whether there is a change in the network state of the terminal device based on any other feasible implementation, however the embodiment of the present disclosure is not limited thereto.

The process of updating the IP address cache set in this situation will be described below with reference to FIG. 9.

Figure 9:
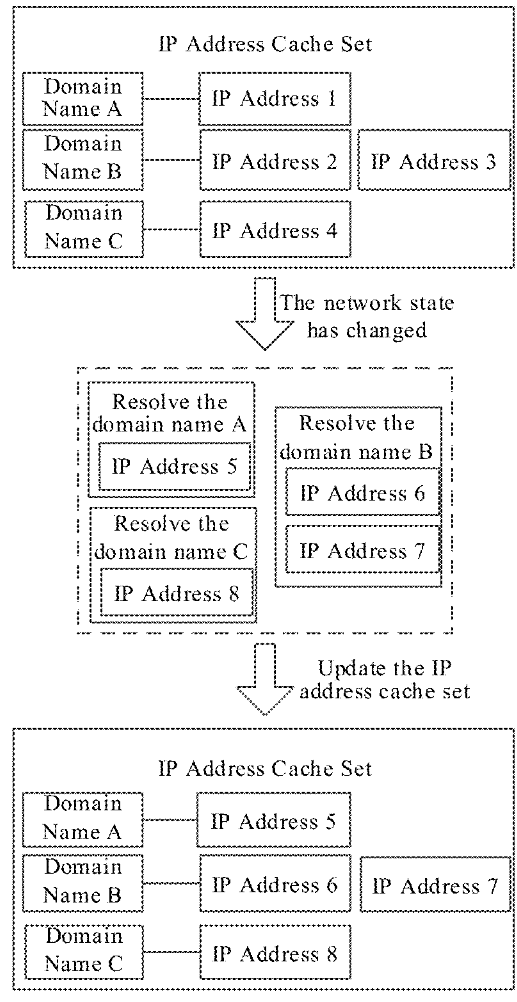
FIG. 9 is a schematic diagram of updating an IP address cache set according to an embodiment of the present disclosure.

FIG. 9 is a schematic diagram of updating the IP address cache set according to an embodiment of the present disclosure. With reference to FIG. 9, an IP address cache set is included. The IP address cache set includes the domain name A, the domain name B, and the domain name C. The IP address corresponding to the domain name A is the IP address 1, the IP addresses corresponding to the domain name B are the IP address 2 and the IP address 3, and the IP address corresponding to the domain name C is the IP address 4. When a change happens in the network state of the terminal device (not shown in FIG. 9) (e.g., switching from a cellular network to a wifi network), the terminal device may resolve the domain name A to obtain the IP address 5, the terminal device may resolve the domain name B to obtain the IP address 6 and the IP address 7, and the terminal device may resolve the domain name C to obtain the IP address 8.

With reference to FIG. 9, the terminal device may update the IP address corresponding to the domain name A based on the IP address 5, update the IP addresses corresponding to the domain name B based on the IP address 6 and the IP address 7, and update the IP address corresponding to the domain name C based on the IP address 8. In the updated IP address cache set, the IP address corresponding to the domain name A is the IP address 5, the IP addresses corresponding to the domain name B are the IP address 6 and the IP address 7, and the IP address corresponding to the domain name C is the IP address 8. In this way, even if a change happens in the network state of the terminal device, the terminal device may still accurately determine the IP addresses corresponding to the domain names of the live streaming based on the IP address cache set. In this way, the first-frame spent time of the live streaming is shortened.

Situation 2: The IP Address Cache Set is Expired.

With regard to nodes of the IP addresses corresponding to the domain names, there is a mechanism for periodical replacement of those bad nodes, so the IP addresses have a validity period. It is to be noted that the validity period of an IP address can be set arbitrarily (such as 10 minutes, 30 minutes, etc.), however, the embodiment of the present disclosure is not limited thereto. For example, if the IP addresses have a validity period of 30 minutes, after the terminal device acquires the IP address cache set, the validity period of the IP addresses in the IP address cache set is 30 minutes.

The terminal device may judge whether the internet protocol addresses in the internet protocol address cache set are within a validity period range, and update the internet protocol addresses in the internet protocol address cache set if the internet protocol addresses in the internet protocol address cache set are not within the validity period range. For example, if the IP addresses have a validity period of 30 minutes, then 30 minutes later of the terminal device acquiring the IP address cache set, the terminal device may determine that the IP addresses in the IP address cache set are not within the validity period range. For example, the IP addresses have a validity period of 30 minutes, and if the terminal device acquired the IP address cache set 10 minutes ago, the terminal device may determine that the IP addresses in the IP address cache set are within the validity period range, and if the terminal device acquired the IP address cache set 30 minutes ago, the terminal device may determine that the IP addresses in the IP address cache set are also within the validity period range.

It is to be noted that the terminal device may judge whether the IP addresses in the IP address cache set are within the validity period range based on any feasible implementation (e.g., based on timestamps at which the IP addresses are acquired, etc.), however, the embodiment of the present disclosure is not limited thereto.

It is to be noted that if any IP address in the IP address cache set is not within the validity period range, the terminal device may re-update all the IP addresses in the IP address cache set.

It is to be noted that the process of updating the IP addresses in the IP address cache set by the terminal device is the same as that in Situation 1, so a description thereof is not repeated in the embodiment of the present disclosure.

The process of updating the IP address cache set in this situation will be described below with reference to FIG. 10.

Figure 10:
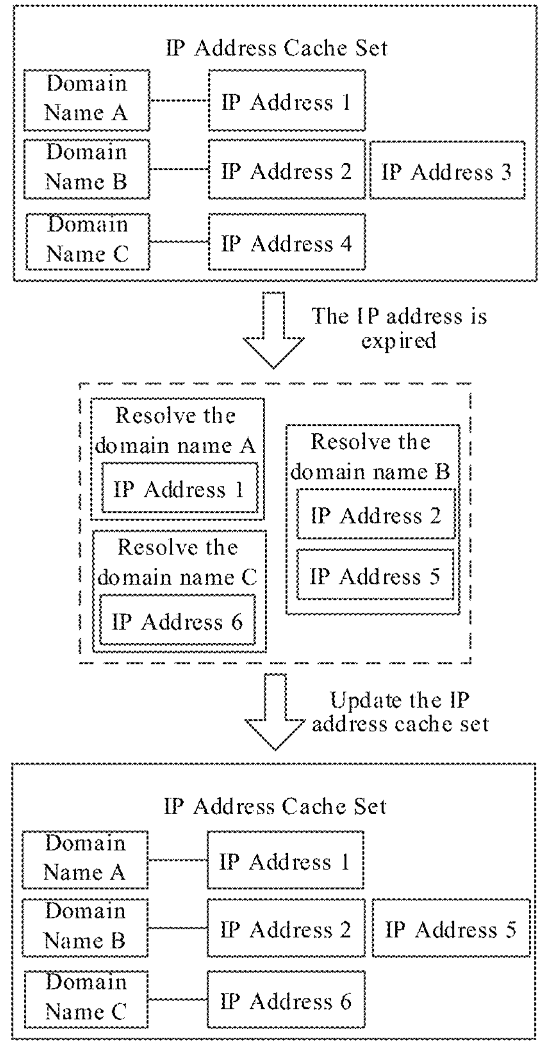
FIG. 10 is a schematic diagram of another way of updating an IP address cache set according to an embodiment of the present disclosure.

FIG. 10 is a schematic diagram of another way of updating the IP address cache set according to an embodiment of the present disclosure. With reference to FIG. 10, an IP address cache set is included. The IP address cache set includes the domain name A, the domain name B, and the domain name C. The IP address corresponding to the domain name A is the IP address 1, the IP addresses corresponding to the domain name B are the IP address 2 and the IP address 3, and the IP address corresponding to the domain name C is the IP address 4. Upon expiration of the IP addresses, the terminal device (not shown in FIG. 10) may resolve the domain name A to obtain the IP address 1, the terminal device may resolve the domain name B to obtain the IP address 2 and the IP address 5, and the terminal device may resolve the domain name C to obtain the IP address 6.

With reference to FIG. 10, because the IP address corresponding to the domain name A remains unchanged, the terminal device may not update the IP address 1 corresponding to the domain name A (or may carry out updating based on the IP address 1, however, the embodiment of the present disclosure is not limited thereto); the terminal device may update the IP addresses corresponding to the domain name B based on the IP address 2 and the IP address 5 and update the IP address corresponding to domain name C based on the IP address 6. In the updated IP address cache set, the IP address corresponding to the domain name A is IP address 1, the IP addresses corresponding to the domain name B are the IP address 2 and the IP address 5, and the IP address corresponding to the domain name C is IP address 6. In this way, the IP address cache set can have the newest IP addresses therein. In this way, the IP addresses corresponding to the domain names of the live streaming can be accurately determined and the first-frame spent time of the live streaming can be shortened.

A method of determining an IP address cache set is provided in the embodiment of the present disclosure is, including: acquiring a domain name list of the live streaming application, resolving a plurality of domain names in the domain name list, determining a first IP address corresponding to each domain name, and determining a corresponding relationship between each domain name and the first IP address as the IP address cache set. In this way, the terminal device may determine the IP addresses corresponding to each domain name of the live streaming application during a cold start of the live streaming application, and when a change happens in the network state of the terminal device or when the IP addresses are expired, the terminal device may update the IP address cache set, which improves the accuracy of the IP address cache set and shortens the first-frame spent time of the live streaming.

On the basis of any one of the above embodiments, the process of the above live streaming processing method will be described below with reference to FIG. 11.

Figure 11:
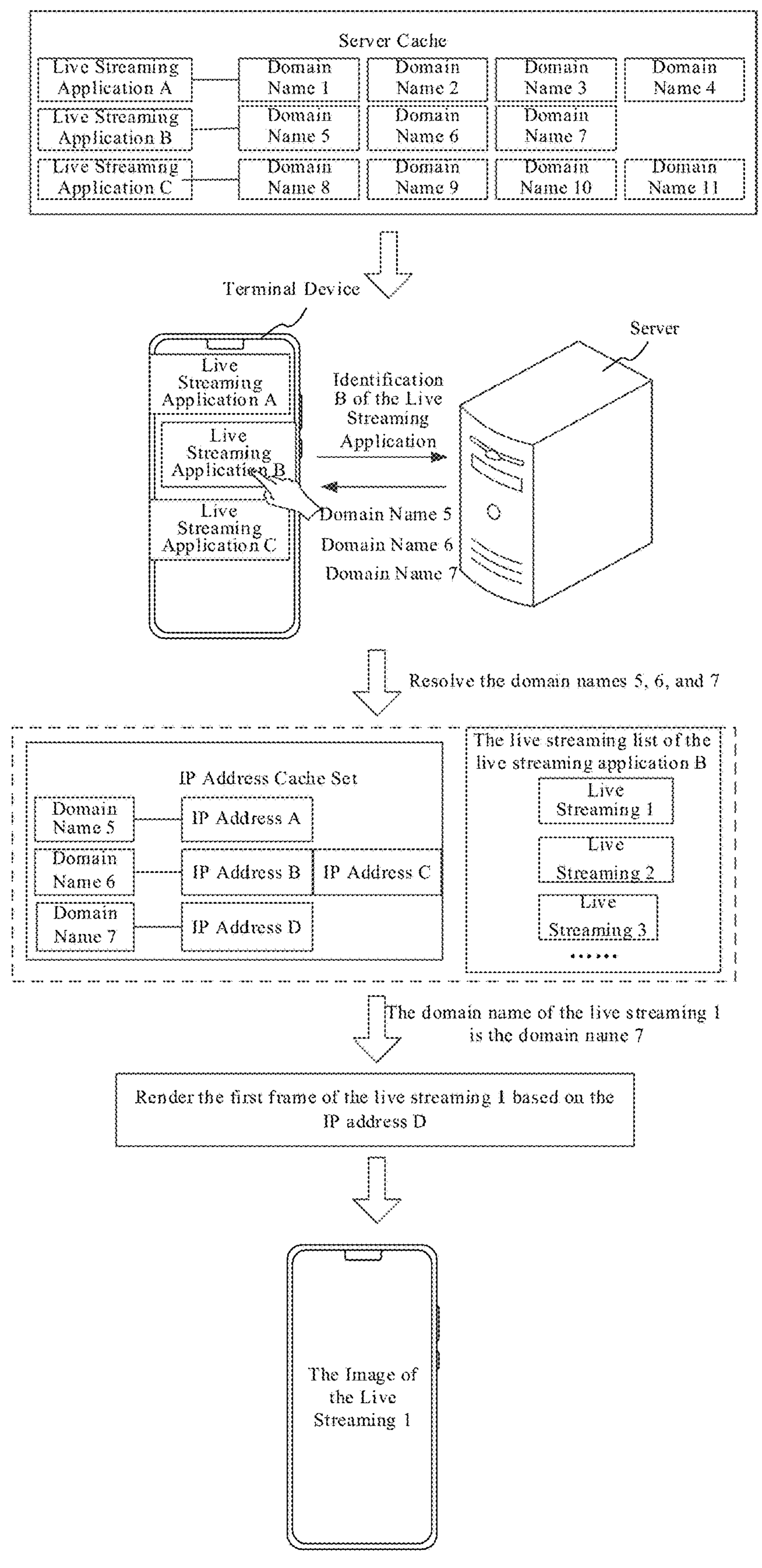
FIG. 11 is a schematic process diagram of a live streaming processing method according to an embodiment of the present disclosure.

FIG. 11 is a schematic process diagram of a live streaming processing method according to an embodiment of the present disclosure. With reference to FIG. 11, a server cache, a terminal device and a server are included. The server cache may include the domain name 1, the domain name 2, the domain name 3, and the domain name 4 corresponding to the live streaming application A, the domain name 5, the domain name 6, and the domain name 7 corresponding to the live streaming application B, and the domain name 8, the domain name 9, domain name 10, and the domain name 11 corresponding to the live streaming application C.

With reference to FIG. 11, the display page of the terminal device includes an application program page, which may include the live streaming application A, the live streaming application B, and the live streaming application C. When the user clicks the live streaming application B, the terminal device may send an identification of the live streaming application B to the server. The server sends the domain name 5, the domain name 6, and the domain name 7 to the terminal device based on the identification of the live streaming application B.

With reference to FIG. 11, the terminal device may resolve the domain name 5, the domain name 6, and the domain name 7 to obtain the IP address cache set, in which the IP address corresponding to the domain name 5 is the IP address A, the IP addresses corresponding to the domain name 6 are the IP address B and the IP address C, and the IP address corresponding to domain name 7 is the IP address D. The terminal device may acquire a live streaming list of the live streaming application B, and this live streaming list includes the live streaming 1, the live streaming 2, and the live streaming 3 that are orderly arranged.

With reference to FIG. 11, because the live streaming 1 is the first live streaming in the live streaming list, the terminal device may determine that the live streaming to be played is the live streaming 1, and the terminal device determines that the domain name of live streaming 1 is the domain name 7 and that the IP address of the live streaming 1 is IP address D. The terminal device may render the first frame of the live streaming 1 and display the image of the live streaming 1 based on the IP address D. In this way, the terminal device can rapidly determine the IP addresses corresponding to the domain names of the live streaming based on the IP address cache set, which can enhance the reliability and robustness of the determination of the IP addresses, and can also shorten the first-frame spent time of the live streaming.

Figure 12:
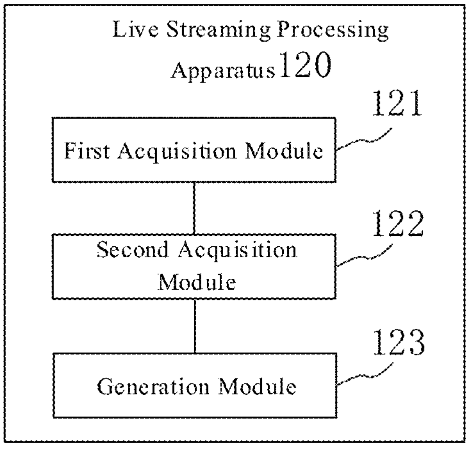
FIG. 12 is a schematically structural diagram of a live streaming processing apparatus according to an embodiment of the present disclosure.

FIG. 12 is a schematically structure diagram of a live streaming processing apparatus according to an embodiment of the present disclosure. With reference to FIG. 12, the live streaming processing apparatus 120 includes a first acquisition module 121, a second acquisition module 122, and a generation module 123.

The first acquisition module 121 is configured to acquire a domain name of a live streaming to be played by a live streaming application;

The second acquire module 122 is configured to acquire an internet protocol address cache set corresponding to the live streaming application, the internet protocol address cache set includes all the domain names associated with the live streaming application and an internet protocol address corresponding to each domain name;

The generation module 123 is configured to generate a first frame of the live streaming based on the domain name of the live streaming and the internet protocol address cache set.

According to one or more embodiments of the present disclosure, for example, the generation module 123 is configured to:

determine whether the internet protocol address cache set includes the internet protocol address corresponding to the domain name of the live streaming based on the domain name of the live streaming;

decode the first frame of the live streaming based on the internet protocol address corresponding to the domain name of the live streaming if the internet protocol address cache set includes the internet protocol address corresponding to the domain name of the live streaming; and resolve the domain name of the live streaming to obtain the internet protocol address corresponding to the domain name of the live streaming, and decode the first frame of the live streaming based on the internet protocol address corresponding to the domain name of the live streaming if the internet protocol address cache set does not include the internet protocol address corresponding to the domain name of the live streaming.

The live streaming processing apparatus provided in the embodiment of the present disclosure may be used to execute the technical solution of the above method embodiment and its implementation principle and technical effects are similar, so a description thereof is not repeated here in this embodiment.

Figure 13:
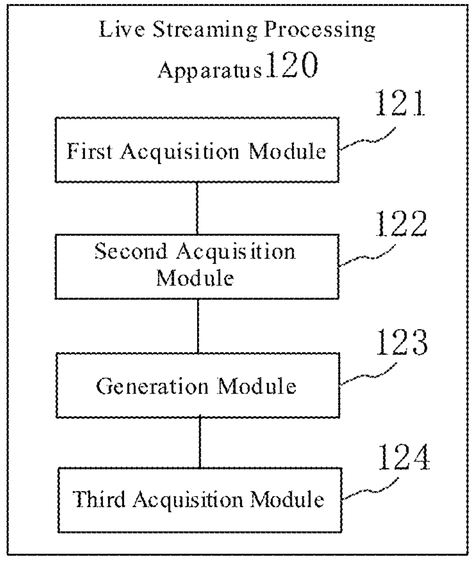
FIG. 13 is a schematically structural diagram of another live streaming processing apparatus according to an embodiment of the present disclosure.

FIG. 13 is a schematically structural diagram of another live streaming processing apparatus according to an embodiment of the present disclosure. With reference to FIG. 13 on the basis of the embodiment shown in FIG. 12, the live streaming processing apparatus 120 further includes a third acquisition module 124. The third acquisition module 124 is configured to:

acquire a domain name list of the live streaming application, the domain name list including all the domain names associated with the live streaming application;

resolve a plurality of domain names in the domain name list, and determine a first internet protocol address corresponding to each domain name; and determine a corresponding relationship between each domain name and the first internet protocol address as the internet protocol address cache set.

According to one or more embodiments of the present disclosure, for example, the third acquisition module 124 is configured to:

send a message to a server in response to a touch operation on the live streaming application, and the message includes an identification of the live streaming application; and receive the domain name list of the live streaming application sent by the server.

According to one or more embodiments of the present disclosure, the third acquisition module 124 is further configured to:

judge whether the network connection type of the terminal device in which the live streaming application is present is changed, or not; and update the internet protocol addresses in the internet protocol address cache set if the network connection type of the terminal device is changed.

According to one or more embodiments of the present disclosure, the third acquisition module 124 is further configured to:

judge whether the internet protocol addresses in the internet protocol address cache set are within a validity period range, or not; and update the internet protocol addresses in the internet protocol address cache set if the internet protocol addresses in the internet protocol address cache set are not within the validity period range.

According to one or more embodiments of the present disclosure, for example, the third acquisition module 124 is configured to:

Re-resolve any domain name in the internet protocol address cache set to obtain a second internet protocol address corresponding to the domain name; and replace the first internet protocol address corresponding to the domain name with the second internet protocol address corresponding to the domain name.

The live streaming processing apparatus provided in the embodiment of the present disclosure may be used to execute the technical solution of the above method embodiment and its implementation principle and technical effects are similar, so a description thereof is not repeated here in this embodiment.

Figure 14:
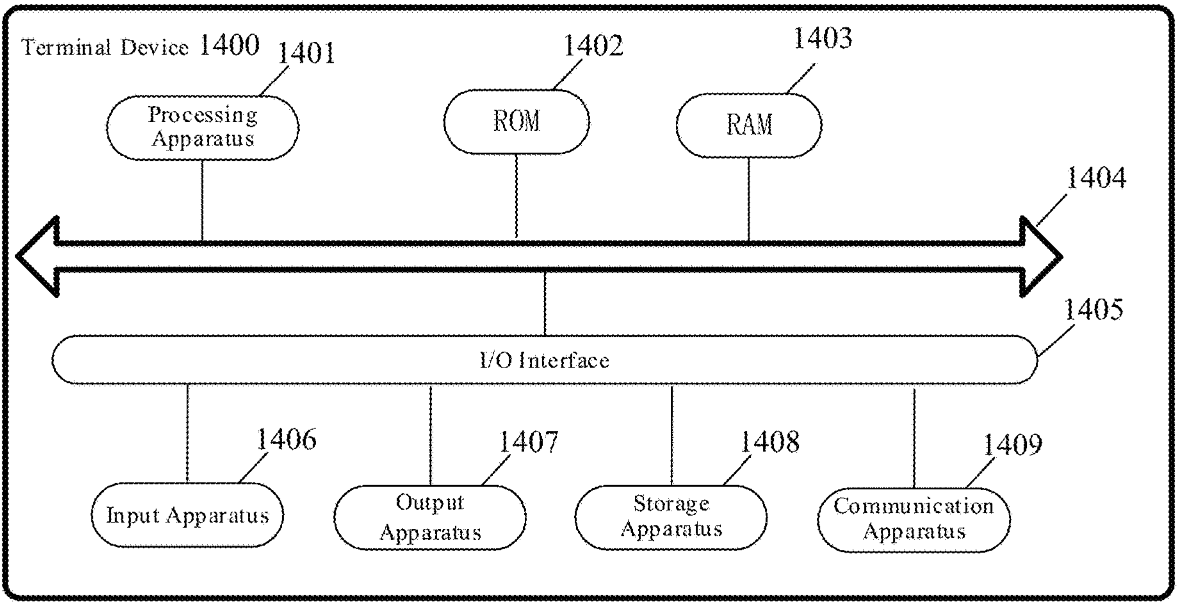
FIG. 14 is a schematically structural diagram of a terminal device according to an embodiment of the present disclosure.

With reference to FIG. 14, FIG. 14 is a schematically structural diagram of a terminal device 1400 suitable for implementing some embodiments of the present disclosure. The terminal devices in embodiments of the present disclosure may include but are not limited to mobile terminals, such as a mobile phone, a notebook computer, a digital streaming receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals, such as a digital TV, a desktop computer, or the like. The electronic device illustrated in FIG. 14 is merely an example, and should not pose any limitation to the functions and the range of use of the embodiments of the present disclosure.

With reference to FIG. 14, the terminal device 1400 includes a memory and a processor, where the processor here may be referred to as a processing apparatus 1401, such as a central processing unit (CPU), a graphic processing unit, or the like. The processing apparatus can perform various appropriate actions and processes based on programs stored in Read Only Memory (ROM) 1402 or programs loaded from storage device 1408 into Random Access Memory (RAM) 1403. In RAM 1403, various programs and data required for the operation of the terminal device 1400 are also stored. The processing apparatus 1401, ROM 1402, and RAM 1403 are connected to each other through a bus 1404. The input/output (I/O) interface 1405 is also connected to the bus 1404.

Usually, the following apparatus may be connected to the I/O interface 1405: an input apparatus 1406, such as a touch screen, a touch pad, a keyboard, a mouse, a camera, a microphone, an accelerometer, a gyroscope, or the like; an output apparatus 1407, such as a liquid crystal display (LCD), a loudspeaker, a vibrator, or the like; a storage apparatus 1408, such as a magnetic tape, a hard disk, or the like; and a communication apparatus 1409. The communication apparatus 1409 may allow the terminal device 1400 to be in wireless or wired communication with other devices to exchange data. Though FIG. 14 illustrates the terminal device 500 having various apparatuses, it is to be understood that not all of the illustrated apparatuses are necessarily implemented or included. More or fewer apparatuses may be implemented or included optionally.

Particularly, according to some embodiments of the present disclosure, the processes described above with reference to the flowcharts may be implemented as a computer software program. For example, some embodiments of the present disclosure include a computer program product, which includes a computer readable program carried by a non-transitory computer-readable medium. The computer program includes program codes for performing the methods shown in the flowcharts. In such embodiments, the computer program may be downloaded online through the communication apparatus 1409 and installed, or may be installed from the storage apparatus 1408, or may be installed from the ROM 1402. When the computer program is executed by the processing apparatus 1401, the above-mentioned functions defined in the methods of some embodiments of the present disclosure are performed.

It is to be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate, or transmit a program used by or in combination with an instruction execution system, apparatus, or device. The program code contained on the computer-readable medium may be transmitted by using any suitable medium, including but not limited to an electric wire, a fiber-optic cable, radio frequency (RF), or the like, or any appropriate combination of them.

In some implementations, communication may be performed using any currently known or future-developed network protocol such as a hypertext transfer protocol (HTTP), and interconnection with digital data communication (e.g., a communication network) in any form or medium may be achieved. Examples of the communication network include a local area network ("LAN"), a wide area network ("WAN"), an internetwork (e.g., the Internet), a peer-to-peer network (e.g., an ad hoc peer-to-peer network), and any currently known or future-developed network.

The above-mentioned computer-readable medium may be included in the above-mentioned terminal device, or may also exist alone without being assembled into the terminal device.

The above-mentioned computer-readable medium carries one or more programs, and when the one or more programs are executed by the terminal device, the terminal device is enabled to execute the methods of the above embodiments.

Some embodiments of the present disclosure provide a computer-readable storage medium in which computer execution instructions are stored. When the processor executes the computer execution instructions, various methods that may be involved in the above embodiments are implemented.

Some embodiments of the present disclosure provide a computer program product, comprising a computer program, when the computer program is executed by a processor, various methods that may be involved in the above embodiments are implemented.

The computer program codes for performing the operations of the present disclosure may be written in one or more programming languages or a combination thereof. The above-mentioned programming languages include but are not limited to object-oriented programming languages, such as Java, Smalltalk, C++, and also include conventional procedural programming languages, such as the "C" programming language or similar programming languages. The program codes may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It is also to be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It is also to be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in any form of software or hardware, or the combination of them. The name of the module or unit does not constitute a limitation of the unit itself under certain circumstances. For example, the first acquisition unit can also be described as "a unit for obtaining at least two Internet Protocol addresses"

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

It is to be noted that the terms of "at least one" mentioned in the present disclosure are illustrative rather than restrictive, and one of ordinary skill in the art should understand that they should be understood as "one or more," unless otherwise explicitly stated in the context.

The names of the messages or information exchanged between multiple devices in the embodiments of the present disclosure are for illustrative purposes only and are not intended to limit the scope of these messages or information.

It is to be understood that, before using the technical solutions in the embodiments of the present disclosure, users should be informed and authorized by relevant laws and regulations in an appropriate manner regarding the type, scope of use, and usage scenarios of personal information involved in the present disclosure.

For example, in response to receiving a user's active request, a prompt message is sent to the user to clearly remind the user that the requested operation will require obtaining and using the user's personal information. In this way, the user can selectively choose whether to provide personal information to software or hardware, such as a terminal device, an application, a server, or a storage medium, that perform the operation of the technical solution of the present disclosure based on the prompt information, or not. As an optional but non-restrictive implementation, in response to receiving the user's active request, sending the prompt information to the user can be done in the form of a pop-up window where the prompt information can be presented in text. In addition, the pop-up window can also carry a selection control for the user to choose between "agree" or "disagree" to provide the personal information to electronic devices.

It is to be understood that the processes of above notification and user's authorization are only illustrative and do not limit the implementation methods in the present disclosure. Other methods that comply with relevant laws and regulations can also be applied to the implementation methods in the present disclosure.

It is to be understood that the data involved in the technical solution in the embodiments of the present disclosures (including but not limited to the data itself, data acquisition, or use) shall comply with the requirements of corresponding laws, regulations, and relevant provisions. The data can include, but not limited to, information, parameters, and messages, such as flow indication information.

In at least one embodiment of the present disclosure, a live streaming processing method is provided, comprising: acquiring a domain name of a live streaming to be played by a live streaming application; acquiring an internet protocol address cache set corresponding to the live streaming application, the internet protocol address cache set comprising all domain names associated with the live streaming application and an internet protocol address corresponding to each domain name; and generating a first frame image of the live streaming based on the domain name of the live streaming and the internet protocol address cache set.

In at least one example, the generating the first frame of the live streaming based on the domain name of the live streaming and the internet protocol address cache set comprises: determining a target domain name same as the domain name of the live streaming in the internet protocol address cache set; determining an internet protocol address corresponding to the target domain name as an internet protocol address corresponding to the domain name of the live streaming; and decoding the first frame of the live streaming based on the internet protocol address corresponding to the domain name of the live streaming, to obtain the first frame of the live streaming.

In at least one example, before the acquiring the domain name of the live streaming to be played by the live streaming application, the method further comprises: acquiring a domain name list of the live streaming application, the domain name list comprising all domain names associated with the live streaming application; resolving a plurality of domain names in the domain name list, and determining a first internet protocol address corresponding to each domain name; and determining a corresponding relationship between each domain name and the first internet protocol address as the internet protocol address cache set.

In at least one example, the acquiring a domain name list of the live streaming application comprises: sending a message to a server in response to a touch operation on the live streaming application, the message comprising an identification of the live streaming application; and receiving the domain name list of the live streaming application sent by the server.

In at least one example, after the determining the corresponding relationship between each domain name and the first internet protocol address as the internet protocol address cache set, the method further comprises: judging whether a network connection type of a terminal device in which the live streaming application is present is changed or not; and if the network connection type of the terminal device is changed, updating the internet protocol addresses in the internet protocol address cache set.

In at least one example, after the determining the corresponding relationship between each domain name and the first internet protocol address as the internet protocol address cache set, the method further comprises: judging whether the internet protocol addresses in the internet protocol address cache set are within a validity period range or not; and if the internet protocol addresses in the internet protocol address cache set are not within the validity period range, updating the internet protocol addresses in the internet protocol address cache set.

In at least one example, the updating the internet protocol addresses in the internet protocol address cache set comprises: re-resolving any domain name in the internet protocol address cache set, to obtain a second internet protocol address corresponding to the domain name; and replacing the first internet protocol address corresponding to the domain name with the second internet protocol address corresponding to the domain name.

The embodiments of the present disclosure provide a live streaming processing method, apparatus, and a terminal equipment. The terminal equipment can acquire the live streaming domain name to be played by the live streaming application, and acquire the Internet protocol address cache set corresponding to the live streaming application. The Internet protocol address cache set includes all the domain names associated with the live streaming application, and the Internet protocol address corresponding to each domain name. Based on the live streaming domain name and Internet protocol address cache set, the first frame of the live streaming is generated. In the above method, because the Internet protocol address cache set can include all the domain names associated with the live streaming application and the corresponding Internet protocol address of each domain name, the terminal device can quickly and accurately determine the Internet protocol address corresponding to the live streaming domain name based on the Internet protocol address cache set, and because the Internet protocol address cache set can include all the domain names of the live streaming application, the hit rate of the live streaming domain name hitting the Internet protocol address cache set is relatively high, which can reduce the first frame spent time of multiple live streaming videos in the live streaming application and improve the user experience.

The above description is only exemplary embodiments of the present disclosure and an explanation of the technical principles used. One of ordinary skill in the art should understand that the scope of the present disclosure is not limited to technical solutions formed by specific combinations of the aforementioned technical features, and should also cover other technical solutions formed by arbitrary combinations of the aforementioned technical features or their equivalent features without departing from the disclosed concept. For example, a technical solution formed by replacing the above features with (but not limited to) technical features with similar functions disclosed in the embodiments of the present disclosure.

Furthermore, although the operations are illustrated in a specific order, this should not be understood as requiring them to be executed in the specific order shown or in sequential order. In certain environments, multitasking and parallel processing may be advantageous. Similarly, although several specific implementation details are included in the above discussion, these should not be interpreted as limitations on the scope of the present disclosure. Some features described in the context of an individual embodiment can also be combined to be implemented in a single embodiment. Various features described in the context of a single embodiment can also be implemented separately or in any suitable sub combination in multiple embodiments.

Although the subject matter has been described with reference to specific structural features and/or logic actions of the method, it should be understood that the subject matter defined in the appended claims is not necessarily limited to the specific features or actions described above. In contrast, the specific features and actions described above are merely exemplary implementations of the subject matter defined in the claims. With respect to the apparatuses in the above embodiments, the specific manner in which each module performs its operation has been described in detail in the embodiments related to the method, and will not be detailed herein.

What is claimed is:

1. A method for reducing latency associated with display of live streaming videos, comprising:

generating an internet protocol address cache set corresponding to a live streaming application based on resolving a plurality of domain names associated with the live streaming application, wherein the internet protocol address cache set indicates an internet protocol address corresponding to each of the plurality of domain names;

receiving input indicative of a live streaming video to be played by the live streaming application, wherein the live streaming video is associated with a first domain name of the plurality of domain names;

determining, based on the internet protocol address cache set corresponding to the live streaming application, that the first domain name corresponds to a first internet protocol address; and rendering a first frame of the live streaming video based on the first internet protocol address without re-resolving the first domain name to reduce a latency between receiving the input and displaying the first frame.

2. The method according to claim 1, wherein the rendering the first frame of the live streaming video based on the the first internet protocol address comprises:

decoding the first frame of the live streaming video based on the first internet protocol address, and obtaining the first frame of the live streaming video.

3. The method according to claim 2, wherein generating the internet protocol address cache set corresponding to the live streaming application comprises:

acquiring a domain name list of the live streaming application, the domain name list comprising all domain names associated with the live streaming application; and resolving the plurality of domain names in the domain name list, and determining the internet protocol address corresponding to each domain name, wherein the internet protocol address cache set indicates a corresponding relationship between each domain name and the corresponding internet protocol address.

4. The method according to claim 3, wherein the acquiring a domain name list of the live streaming application comprises:

sending a message to a server in response to a touch operation on the live streaming application, the message comprising an identification of the live streaming application; and receiving the domain name list of the live streaming application sent by the server.

5. The method according to claim 3, wherein generating the internet protocol address cache set corresponding to the live streaming application further comprises:

judging whether a network connection type of a terminal device in which the live streaming application is present is changed or not; and if the network connection type of the terminal device is changed, updating the internet protocol addresses in the internet protocol address cache set.

6. The method according to claim 3, wherein generating the internet protocol address cache set corresponding to the live streaming application further comprises:

judging whether the internet protocol addresses in the internet protocol address cache set are within a validity period range or not; and if the internet protocol addresses in the internet protocol address cache set are not within the validity period range, updating the internet protocol addresses in the internet protocol address cache set.

7. The method according to claim 1, wherein generating the internet protocol address cache set corresponding to the live streaming application comprises:

acquiring a domain name list of the live streaming application, the domain name list comprising all domain names associated with the live streaming application; and resolving the plurality of domain names in the domain name list, and determining the internet protocol address corresponding to each domain name, wherein the internet protocol address cache set indicates a corresponding relationship between each domain name and the corresponding internet protocol address.

8. The method according to claim 7, wherein generating the internet protocol address cache set corresponding to the live streaming application further comprises:

judging whether a network connection type of a terminal device in which the live streaming application is present is changed or not; and if the network connection type of the terminal device is changed, updating the internet protocol addresses in the internet protocol address cache set.

9. The method according to claim 8, wherein the updating the internet protocol addresses in the internet protocol address cache set comprises:

re-resolving any domain name in the internet protocol address cache set, to obtain an updated internet protocol address corresponding to the domain name; and replacing the internet protocol address corresponding to the domain name with the updated internet protocol address corresponding to the domain name.

10. The method according to claim 7, wherein generating the internet protocol address cache set corresponding to the live streaming application further comprises:

judging whether the internet protocol addresses in the internet protocol address cache set are within a validity period range or not; and if the internet protocol addresses in the internet protocol address cache set are not within the validity period range, updating the internet protocol addresses in the internet protocol address cache set.

11. The method according to claim 10, wherein the updating the internet protocol addresses in the internet protocol address cache set comprises:

re-resolving any domain name in the internet protocol address cache set, to obtain an updated internet protocol address corresponding to the domain name; and replacing the internet protocol address corresponding to the domain name with the updated internet protocol address corresponding to the domain name.

12. The method according to claim 7, wherein the acquiring a domain name list of the live streaming application comprises:

sending a message to a server in response to a touch operation on the live streaming application, the message comprising an identification of the live streaming application; and receiving the domain name list of the live streaming application sent by the server.

13. A terminal device, comprising: a processor and a memory;

wherein computer executable instructions are stored in the memory;

the processor executes a live streaming processing method upon the processor executing the computer executable instructions stored in the memory, wherein the live streaming processing method comprises:

generating an internet protocol address cache set corresponding to a live streaming application based on resolving a plurality of domain names associated with the live streaming application, wherein the internet protocol address cache set indicates an internet protocol address corresponding to each of the plurality of domain names;

receiving input indicative of a live streaming video to be played by the live streaming application, wherein the live streaming video is associated with a first domain name of the plurality of domain names;

determining, based on the internet protocol address cache set corresponding to the live streaming application, that the first domain name corresponds to a first internet protocol address; and rendering a first frame of the live streaming video based on the first internet protocol address without re-resolving the first domain name to reduce a latency between receiving the input and displaying the first frame.

14. A non-transitory computer readable storage medium, wherein computer executable instructions are stored in the non-transitory computer readable storage medium, and a live streaming processing method is implemented upon the computer executable instructions being executed by at least a processor; wherein the live streaming processing method comprises:

generating an internet protocol address cache set corresponding to a live streaming application based on resolving a plurality of domain names associated with the live streaming application, wherein the internet protocol address cache set indicates an internet protocol address corresponding to each of the plurality of domain names;

receiving input indicative of a live streaming video to be played by the live streaming application, wherein the live streaming video is associated with a first domain name of the plurality of domain names;

determining, based on the internet protocol address cache set corresponding to the live streaming application, that the first domain name corresponds to a first internet protocol address; and rendering a first frame of the live streaming video based on the first internet protocol address without re-resolving the first domain name to reduce a latency between receiving the input and displaying the first frame.

* * * * *